July 19, 1949.　　　　L. E. RUTH　　　　2,476,511
TRACTOR HITCH
Filed April 22, 1948
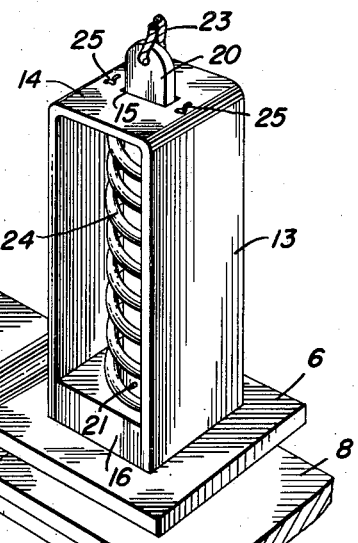
Fig. 1.
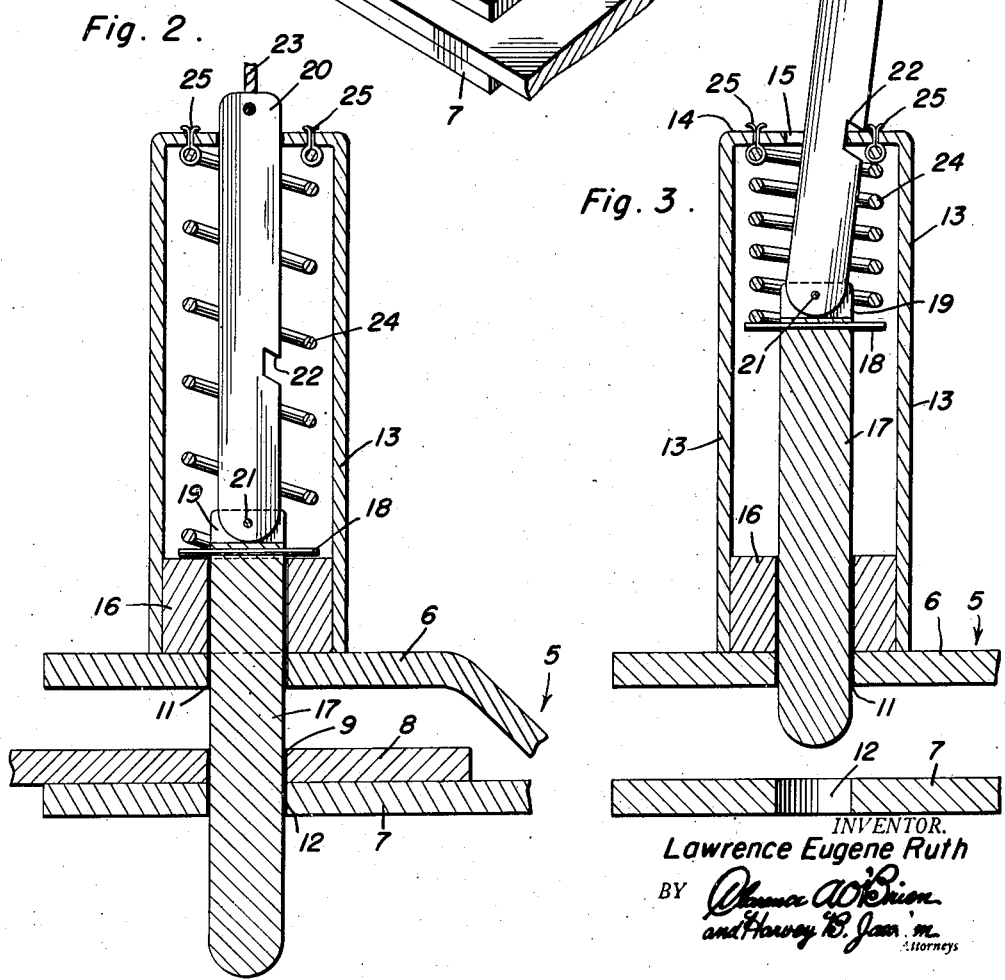
Fig. 2.
Fig. 3.
INVENTOR.
Lawrence Eugene Ruth
BY
Attorneys Patented July 19, 1949

2,476,511

UNITED STATES PATENT OFFICE 2,476,511

TRACTOR HITCH

Lawrence Eugene Ruth, Marshalltown, Iowa

Application April 22, 1948, Serial No. 22,591

3 Claims. (Cl. 280—33.15)

The present invention relates to new and useful improvements in a novel tractor hitch.

The purpose of the invention is to enable the driver of the tractor to control the coupling pin by way of the usual pull rope while he remains seated.

The principal object of the invention is to provide a hitch construction which, compared to known types, is structurally distinct and possessed of worth-while refinements and improvements.

More specifically, novelty is predicated upon a spring-pressed latch pin which is properly cooperable with the jaws of the clevis part of the hitch, there being a latch member pivotally connected with said pin, the pull rope being connected with the upper end of the latch member and the latter being provided with a keeper notch and said notch being arranged to releasably engage a coacting retainer yoke.

In carrying out the preferred embodiment of the invention, a yoke is rigidly mounted on the upper jaw of the clevis and said yoke serves to accommodate the coupling pin, a coiled spring which serves to normally project the pin through pin holes provided in the jaws of the clevis, the bight portion of the yoke being slotted to accommodate a latch member controlled by the pull rope and said latch member being operatively connected with the coupling pin and provided with the aforementioned keeper notch in a manner to permit the latter to be releasably engaged with one end of the slot, whereby to hold the coupling pin in releasing position against the tension of the spring.

Other objects, features and advantages will become more readily apparent from the following description and the accompanying illustrative drawings.

In the drawings, wherein like numerals are employed to designate like parts throughout the same:

Figure 1 is a fragmentary perspective view showing a tractor hitch constructed in accordance with the principles of the present invention;

Figure 2 is a central vertical sectional view through the structure seen in Figure 1, the view being on an enlarged scale;

Figure 3 is a view similar to Figure 1 showing the manner in which the coupling pin is withdrawn and held in released position for convenient hitching and unhitching of the trailer drawbar.

Referring now to the drawings by reference numerals, the tractor clevis is denoted by the numeral 5 and includes horizontal, parallel and spaced, upper and lower jaws 6 and 7 between which the apertured end of the customary trailer drawbar 8 fits when in hitching or coupling position. The aperture or pin hole 9 in the drawbar is lined up with complemental pin holes 11 and 12 in said jaws.

The attachment, which constitutes the essence of the present invention, comprises a vertically disposable yoke 13 whose bight portion 14 is provided with a slot 15. A centrally apertured collar 16 is mounted between the free ends of the limbs of the yoke, and said collar and yoke are suitably secured to the upper jaw 6 so that the opening in the collar lines up with the pin holes 11 and 12. The coupling pin 17 is slidably mounted in the collar and its lower end, as shown in Figure 2, projects through the holes 11, 9 and 12 in a manner to releasably connect the drawbar 8 with the jaws 6 and 7 of the clevis in a well-known manner. The upper end of the coupling pin projects above the collar and between the limbs of the yoke where it is provided with a stop pin 18 and a central notch 19. The adjacent lower end of the latch member 20, which is slidable through the slot 15, is rounded and fitted into the notch and hingedly connected to the pin 17 by a pivot 21. One longitudinal edge of the latch member is provided with a keeper notch 22 which is properly shaped and angled to releasably engage one end portion of the slot 15 as shown in Figure 3. Attached to the upper projectable and retractable end of the latch member is the customary pull rope 23. In practice, the operating end of the pull rope is fastened to a clip or holder on the driver's seat (not shown) on the tractor. A coiled spring 24 is provided and this surrounds the latch member 20 and also the notched end portion of the coupling pin 17. The lower end of the spring bears upon the stop pin 18. The uppermost coil or convolution of the spring is anchored by cotter keys or the like 25 to the bight portion 14. The spring is of an expansion type and normally exerts downward pressure on the coupling pin 17, as is obvious. It follows that when the latch member 20 is disengaged, the coupling pin 17 takes the position shown in Figure 2 where it functions, in a somewhat well-known manner, to connect the trailer drawbar 8 releasably with the jaws 6 and 7 of the tractor clevis 5. What I have done as an improvement is to provide the yoke 13, to equip it with a collar 16 to accommodate the spring-pressed projectable and retractable coupling pin 17, said yoke serving to accommodate said pin 17, the pin seating spring 24 and the notched latch member 20 to permit the result shown in Figure 3 to be accomplished. Assuming, therefore, that it is desired to release the drawbar, it is obvious that by exerting a pull on the pull rope 23, the pin 17 will ride up through the collar and between the limbs of the yoke and will compress the spring. At a certain point, the latch member will kick laterally on its pivot 21 and by properly manipulating the pull rope the notch 22 will be engaged with one end portion of the slot 15. Thus, the slotted bight portion of the yoke becomes a detent or retainer for the notched edge of the latch member 20. With the pin 17 in raised position, if the drawbar is to be recoupled to the clevis, it is possible simply to "whip" the pull rope and release the latch member, in an obvious manner.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An attachment for a tractor clevis comprising a U-shaped yoke including a bight portion, said bight portion having a slot, a centrally apertured guide collar fitted between the free ends of the limbs of said yoke, a coupling pin slidable in said collar with one end portion operable between the limbs of said yoke, a latch member hingedly connected at its lower end to the upper end of said pin, the upper end of said latch member being slidable through the slot in said bight portion, one edge of said latch member having a keeper notch and said keeper notch being releasably engageable with one end portion of said slot, and a coiled spring anchored at its upper end to the bight portion of said yoke and surrounding said latch member and the upper end of said pin and having end thrust relation on said pin.

2. An attachment for the upper jaw of a tractor clevis comprising an inverted U-shaped yoke including a bight portion, said bight portion having a slot therein, a latch member fitted and slidable firmly in the slot, the upper end of said latch member projecting beyond said bight portion to accommodate a pull rope, a guide collar mounted between the lower ends of the limbs of said yoke and centrally apertured, a coupling pin slidable in said guide collar and projecting into the yoke and occupying a position between the limbs and having its upper ends bifurcated, the lower end of said latch members fitting and being hinged between said furcations, one longitudinal edge portion of said latch member having a keeper notch and said keeper notch being releasably engageable with one end portion of said slot, and a coiled spring anchored at its upper end to the bight portion and bearing at its lower end against said pin.

3. An attachment for tractor clevis comprising a U-shaped yoke including a bight portion and limb portions, said bight portion having an aperture, a guide collar fitted between the limbs of said yoke, a coupling pin slidable in said collar with one end portion operable between the limbs of the said yoke and the other end portion beyond the said collar, a latch member hingedly connected to said pin, the upper end of said latch member being slidable through the aperture in said bight portion, one edge of said latch member having a keeper notch and said keeper notch being releasably engageable with one edge portion of said aperture, and a coil spring anchored to said yoke and surrounding said latch member and the upper end portion of said pin and having end thrust engagement with said pin.

LAWRENCE EUGENE RUTH.

REFERENCES CITED

The following references are of record in the file of this patent:

UNITED STATES PATENTS

| Number | Name | Date |
| --- | --- | --- |
| 80,688 | White | Aug. 4, 1868 |
| 130,585 | Lochbaum | Aug. 20, 1872 |
| 160,162 | Clem | Feb. 23, 1875 |
| 275,880 | Bigney | Apr. 17, 1883 |
| 372,979 | Hughey | Nov. 8, 1887 |
| 472,505 | Langschmidt | Apr. 5, 1892 |
| 1,649,980 | Schlagenhauf | Nov. 22, 1927 |
| 2,140,132 | Hollett | Dec. 13, 1938 |